United States Patent
Bower, III et al.

(10) Patent No.: US 11,762,695 B2
(45) Date of Patent: Sep. 19, 2023

(54) TRANSPARENT MEMORY MANAGEMENT FOR OVER-SUBSCRIBED ACCELERATORS

(71) Applicant: LENOVO ENTERPRISE SOLUTIONS (SINGAPORE) PTE. LTD., Singapore (SG)

(72) Inventors: Fred A. Bower, III, Durham, NC (US); Caihong Zhang, Shanghai (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 1209 days.

(21) Appl. No.: 16/369,831

(22) Filed: Mar. 29, 2019

(65) Prior Publication Data
US 2020/0310878 A1    Oct. 1, 2020

(51) Int. Cl.
G06F 9/50   (2006.01)
G06T 1/60   (2006.01)
G06T 1/20   (2006.01)

(52) U.S. Cl.
CPC ............ G06F 9/5016 (2013.01); G06T 1/20 (2013.01); G06T 1/60 (2013.01); G06F 2209/503 (2013.01); G06F 2209/5013 (2013.01)

(58) Field of Classification Search
CPC .......... G06F 9/5016; G06F 2209/5013; G06F 2209/503; G06T 1/20; G06T 1/60
See application file for complete search history.

(56) References Cited

U.S. PATENT DOCUMENTS

| | | | |
|---|---|---|---|
| 2012/0117298 A1* | 5/2012 | Scannell | G06F 9/45558 711/6 |
| 2017/0364408 A1* | 12/2017 | Sherman | G06F 13/1663 |
| 2018/0210732 A1* | 7/2018 | Zhu | G06F 15/78 |
| 2019/0034337 A1* | 1/2019 | Arafa | G06F 12/08 |
| 2019/0102311 A1* | 4/2019 | Gupta | G06F 12/0897 |
| 2019/0347125 A1* | 11/2019 | Sankaran | G06F 9/3834 |
| 2020/0050401 A1* | 2/2020 | Gibb | G06F 9/3877 |
| 2021/0044503 A1* | 2/2021 | Zhang | H04L 41/5025 |
| 2021/0173589 A1* | 6/2021 | Benisty | G06F 9/4881 |

* cited by examiner

*Primary Examiner* — Jorge A Chu Joy-Davila (57) ABSTRACT

Transparent memory management for over-subscribed accelerators is disclosed. A request from a remote initiator to execute a workload on a shared accelerator is received at a host system comprising the shared accelerator. A determination is made that there is insufficient physical memory of the accelerator to accommodate the request from the remote initiator. Responsive to determining that there is insufficient physical memory of the accelerator. An allocation of host system memory is requested for the remote initiator from the host system. A mapping between the remote initiator and the allocation of host system memory is then created.

20 Claims, 9 Drawing Sheets

TRANSPARENT MEMORY MANAGEMENT FOR OVER-SUBSCRIBED ACCELERATORS

BACKGROUND

Field of the Invention

The field of the invention is data processing, or, more specifically, methods, apparatus, and products for transparent memory management for over-subscribed accelerators.

Description of Related Art

Hardware accelerators such as graphics processing units (GPUs), field programmable gate arrays (FPGAs), and application-specific integrated circuits (ASICs) perform special purpose computing functions more efficiently than a general purpose central processing unit (CPU). In a shared computing environment, multiple client computers, or initiators, may share an accelerator on a remote server. In such an environment, the physical hardware of the accelerator is shared by the multiple initiators and a virtualized accelerator is presented to each initiator.

Although the computational resources may be dynamically allocated among the several attached initiators, and adding new initiators may not introduce significant computational overhead, there is a finite amount accelerator physical memory that can be allocated and shared among the initiators. When a new initiator is attached to the server hosting the accelerator, there may be insufficient accelerator physical memory to allocate to the new initiator because, for example, all of the accelerator physical memory has already been allocated to prior attached initiators. In such a situation, the accelerator is said to be "over-subscribed." Existing solutions require the accelerator to stop running the computational workloads of the prior attached initiators so that accelerator physical memory can be reallocated to accommodate the new initiator. This process is disruptive, and improvements in memory management for over-subscribed accelerators are needed.

SUMMARY

Embodiments in accordance with present invention provide improved memory management for over-subscribed accelerators that is transparent to the attached initiators sharing the accelerator resources. A memory sharing scheme is implemented on the target system that is hosting the accelerator being shared by multiple initiators through memory mapping functions of a shared accelerator library. Each initiator is given full-capacity virtual accelerator via the shared accelerator library. When the initiators are over-subscribing the physical memory on the target accelerator, the accelerator sharing library remaps some of the target host system memory as a buffer for the over-subscribed capacity. The accelerator sharing library then manages the memory mapping of the accelerator instructions to cause the buffer to be accessed when processing on that portion of initiator workload is requested.

One embodiment in accordance with the present invention is directed to a method of transparent memory management for over-subscribed accelerators, the method comprising receiving, at a host system comprising a shared accelerator, a request to execute a workload on the accelerator from a remote initiator, determining that there is insufficient physical memory of the accelerator to accommodate the request from the remote initiator, responsive to determining that there is insufficient physical memory of the accelerator, requesting an allocation of host system memory to the remote initiator, and creating a mapping between the remote initiator and the allocation of host system memory.

Another embodiment in accordance with the present invention is directed to an apparatus for transparent memory management for over-subscribed accelerators, the apparatus comprising a computer processor, a computer memory operatively coupled to the computer processor, the computer memory having disposed within it computer program instructions that, when executed by the computer processor, cause the apparatus to carry out the steps of receiving, at a host system comprising a shared accelerator, a request to execute a workload on the accelerator from a remote initiator, determining that there is insufficient physical memory of the accelerator to accommodate the request from the remote initiator, responsive to determining that there is insufficient physical memory of the accelerator, requesting an allocation of host system memory to the remote initiator, and creating a mapping between the remote initiator and the allocation of host system memory.

Yet another embodiment in accordance with the present invention is directed to a computer program product for transparent memory management for over-subscribed accelerators, the computer program product disposed upon a computer readable medium, the computer program product comprising computer program instructions that, when executed, cause a computer to carry out the steps of receiving, at a host system comprising a shared accelerator, a request to execute a workload on the accelerator from a remote initiator, determining that there is insufficient physical memory of the accelerator to accommodate the request from the remote initiator, responsive to determining that there is insufficient physical memory of the accelerator, requesting an allocation of host system memory to the remote initiator, and creating a mapping between the remote initiator and the allocation of host system memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
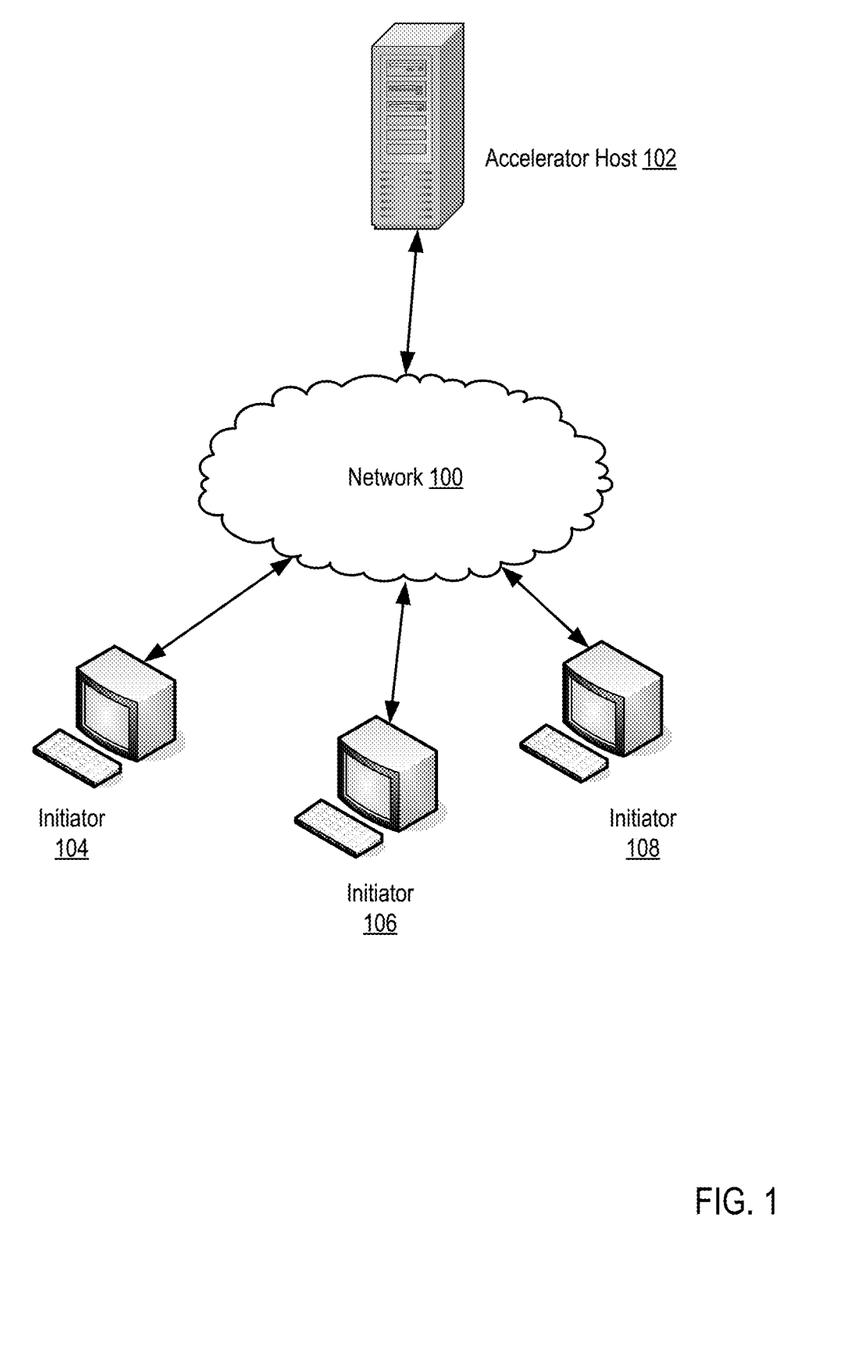
FIG. 1 is a network diagram illustrating a system configured for transparent memory management for over-subscribed accelerators according to embodiments of the present invention.

Exemplary methods, apparatus, and products for transparent memory management for over-subscribed accelerators in accordance with the present invention are described with reference to the accompanying drawings, beginning with FIG. 1. FIG. 1 sets forth a network diagram of a system configured for transparent memory management for over-subscribed accelerators according to embodiments of the present invention. The system of FIG. 1 includes an accelerator host server (102) that hosts shared accelerator hardware, such as a graphics processing units (GPUs), field programmable gate arrays (FPGAs), and application-specific integrated circuits (ASICs) to perform special purpose computing functions. Accelerator processing resources are shared by the initiators (104, 106, 108), which behave as device virtualization endpoints that view the accelerator host server (102) as a local device that appears to have an available amount of memory for processing. The accelerator host server (102) runs a library that serves as the target-side of an initiator-target library pair wherein the libraries provide a virtual copy of the shared hardware in a hardware tree of the initiators (104, 106, 108). That is, the shared resource appears to be a dedicated, locally-connected element within the initiators (104, 106, 108). The target library provides the target terminal of the tunnel between the initiator initiators (104, 106, 108) and the shared resource of the accelerator host server (102). The accelerator host server (102) system CPU and operating system do not provide any computational offload for the initiator workload. In some embodiments, the accelerator host server (102) may not even have a traditional CPU and operating system, but rather may run a specialized software stack that simply supports the target library for device sharing and local memory management. A network (100), such as an ethernet fabric, connects initiators (104, 106, 108) to the accelerator host server (102).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Transparent memory management for over-subscribed accelerators in accordance with the present invention is generally implemented with computers, that is, with automated computing machinery. The automated computing machinery may include general purpose computing machinery as well as application-specific computing machinery. In the system of FIG. 1, for example, the accelerator host server (102) and initiators (104, 106, 108) are implemented to some extent at least as computers. For further explanation, therefore, FIG. 2 sets forth a block diagram of automated computing machinery comprising an exemplary computer (152) configured for transparent memory management for over-subscribed accelerators according to embodiments of the present invention. The computer (152) of FIG. 2 includes at least one computer processor (156) ('CPU') as well as random access memory (168) ('RAM') which is connected through a high-speed memory bus (166) and bus adapter (158) to processor (156) and to other components of the computer (152).

Figure 2:
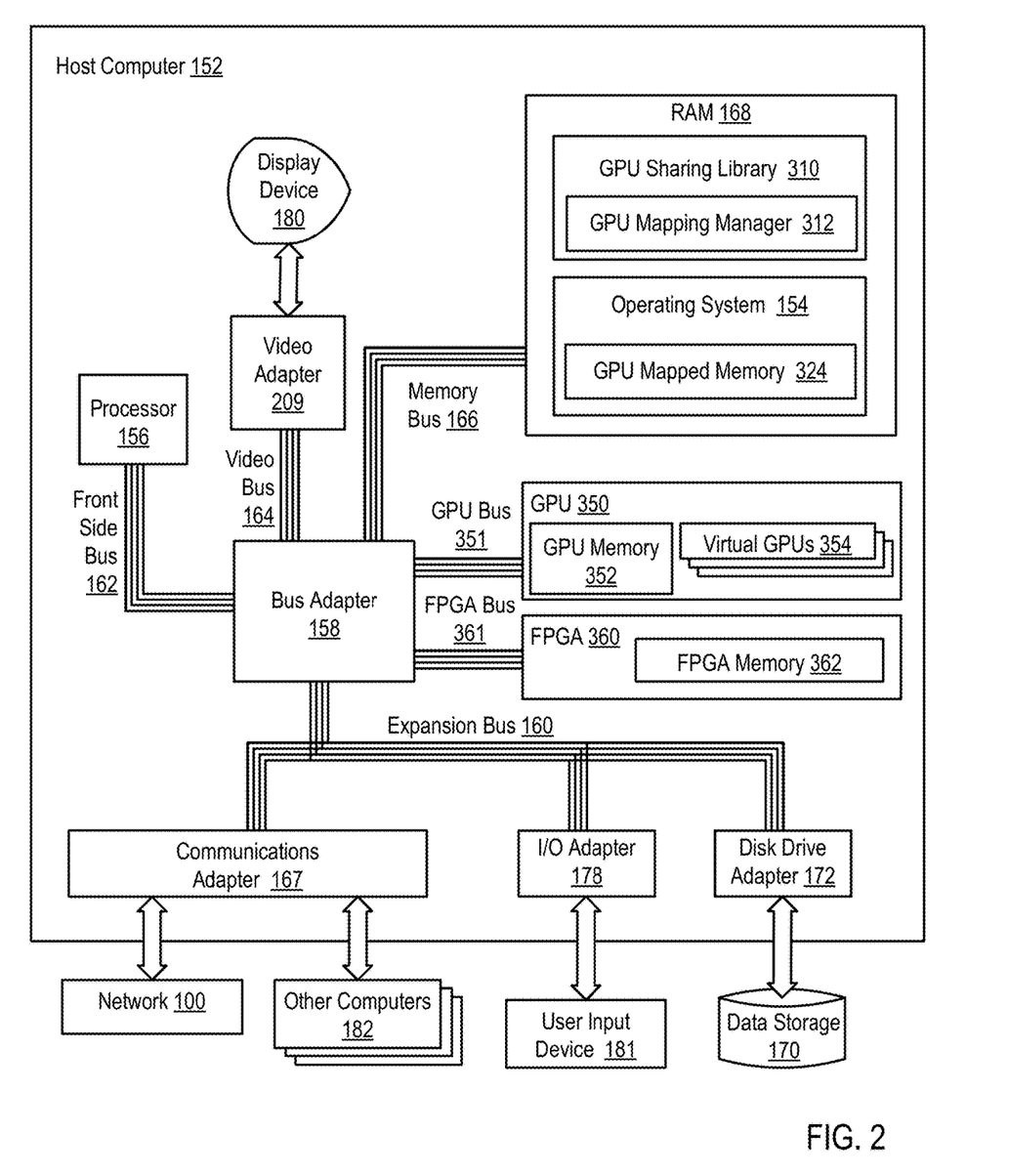
FIG. 2 is block diagram illustrating an exemplary server configured for transparent memory management for over-subscribed accelerators according to embodiments of the present invention.

Stored in RAM (168) is an accelerator sharing library (310), a module of computer program instructions for shared accelerator virtualization. Also stored RAM (168) is an accelerator mapping manager 312, a module of computer program instructions for improved transparent memory management for over-subscribed accelerators according to embodiments of the present invention. Also stored in RAM (168) is accelerator mapper memory (324), which is host system physical memory that may be allocated to a remote initiator when an accelerator is in an over-subscribed state.

Also stored in RAM (168), in some embodiments, is an operating system (154). Operating systems useful in computers configured for transparent memory management for over-subscribed accelerators according to embodiments of the present invention include UNIX™, Linux™, Microsoft XP™, AIX™, IBM's i5/OS™, and others as will occur to those of skill in the art. The operating system (154), accelerator sharing library (310), accelerator mapping manager (312), and accelerator mapped memory (324) in the example of FIG. 2 are shown in RAM (168), but many components of such software typically are stored in non-volatile memory also, such as, for example, on a disk drive (170). In some embodiments according to the present invention, the OS (154) may be omitted, and functions of the OS (154) may be assumed by the accelerator sharing library (310) in the allocation of accelerator mapped memory (324).

The computer (152) of FIG. 2 may include disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for transparent memory management for over-subscribed accelerators according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 may include one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182), which may be initiators (104, 106, 108), and for data communications with a data communications network (100), which may connect to initiators (104, 106, 108). Examples of communications adapters useful in computers configured for transparent memory management for over-subscribed accelerators according to embodiments of the present invention include Ethernet (IEEE 802.3) adapters that support remote direct memory addressing (RDMA) such as RDMA over Converged Ethernet (RoCE), peripheral component interconnect express (PCIe) adapters that support RDMA, and other such adapters that support RDMA, as will be recognized by those of skill in the art.

The exemplary computer (152) of FIG. 2 includes accelerator hardware and software such as a GPU (350) connected via a GPU bus (351) to the bus adapter (158). The GPU (350) includes GPU physical memory (352), one or more virtual GPU contexts (354), one or more caches (not shown), and other components that will occur to those of skill in the art. The GPU bus (351) may be a PCIe bus or similar high-speed bus.

The exemplary computer (152) of FIG. 2 includes accelerator hardware and software such as an FPGA (360) connected via an FPGA bus (361) to the bus adapter (158). The FPGA (360) includes FPGA physical memory (362) and other components that will occur to those of skill in the art. The FPGA bus (361) may be a PCIe bus or similar high-speed bus.

While the exemplary computer system (152) may host a shared accelerator in the form of a GPU, FPGA, ASIC, and the like, the following examples are directed to GPU accelerators for ease of explanation.

In remote GPU sharing of composable infrastructure, the GPU memory of one GPU target of host system may be sliced and allocated to its attached initiators and used exclusively. For example, if a GPU target is shared by two attached initiators and each initiator uses 50% of the GPU memory, a new initiator wanting to run workload on the GPU will require the two existing initiators to stop their running workloads and a memory manager must reallocate the entire GPU memory to the now three initiators.

Thus, this process used to enable the over-subscription of memory requires the interruption of the running workloads to bring in a new workload because the memory being used is taken from each of the running workloads at the time of placement the new workload. Transparent memory management for an over-subscribed GPU according to embodiments of the present invention prevents the interruption of workloads under these conditions.

Figure 3:
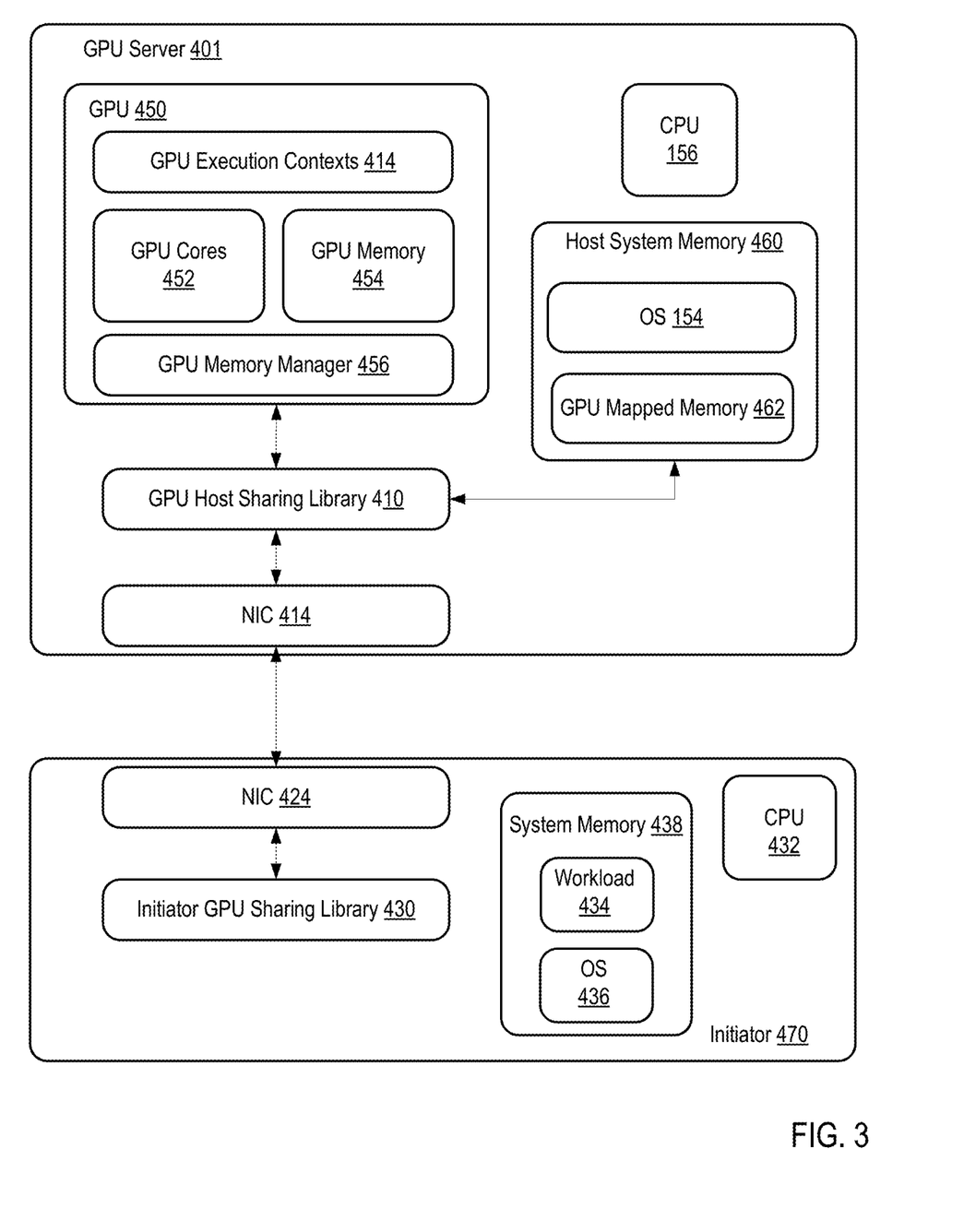
FIG. 3 is block diagram illustrating an exemplary accelerator server and initiator configured for transparent memory management for over-subscribed accelerators according to embodiments of the present invention.

FIG. 3 is block diagram illustrating an exemplary GPU host server and an initiator configured for transparent memory management for over-subscribed accelerators according to embodiments of the present invention. A GPU server (401) includes one or more target GPUs (450) that are shared by one or more initiators (470). In the example of FIG. 3, the GPU (450) includes one or more GPU cores (452) for executing GPU instructions, a GPU memory (454) that may be partially allocated to the one or more initiators (470), a GPU memory manager (456) for allocating and managing the GPU memory (454). The GPU (450) may further include GPU execution contexts (414) that provide GPU virtualization to each attached initiator (470). The GPU server (401) further includes a network interface card (414) for communicating with and receiving workloads from the one or more initiators (470) and a GPU host sharing library (410) providing remote GPU virtualization for the one or more initiators (470). The GPU server (401) further includes host system memory (460) comprising an OS (154) and other applications (not shown) that are executed by a CPU (156). The host system memory (460) further includes GPU mapped memory (462) that may be allocated to an initiator (470) and used as an alternative to GPU memory when the GPU memory (454) is over-subscribed.

Each of the one or more initiators (470) can be given full-capacity virtual GPU via the GPU host sharing library (410). When the initiators are over-subscribing the GPU physical memory (454) on the target GPU (450), the GPU host sharing library (410) remaps some of the host system memory (460), that is, the GPU mapped memory (462), as a buffer for the over-subscribed capacity. The GPU host sharing library (410) then manages the memory mapping of the GPU instructions to cause the GPU mapped memory (462) to be accessed when processing on that portion of initiator workload is requested. The GPU host sharing library (410) may request allocation of the GPU mapped memory (462) from the OS (154), and may communicate to the GPU memory manager (456) that processing on that particular workload is being mapped outside of the GPU memory (454) to the GPU mapped memory (462) in the host system memory (460). As memory management of the GPU mapped memory (462) is handled by the GPU host sharing library (410), the memory management scheme is invisible to the initiator (470), thus requiring no special processing by the initiator (470) to utilize the GPU mapped memory (462), and thus providing complete GPU virtualization.

In one embodiment according to the present invention, the GPU host sharing library (410) may be an extension of the remote Compute Unified Device Architecture (rCUDA), an extension of other GPU virtualization APIs, or a standalone library, as will be recognized by those of skill in the art.

The one or more initiators (470) also includes a NIC (424) for communicating with the GPU server (401), a CPU (432), system memory (438) such as RAM storing an OS (436) and other applications (not shown), and a GPU initiator sharing library (430) for API calls to the GPU host sharing library (410) in the GPU server (401) for the processing of a workload (434). The initiator GPU sharing library may be implemented, without modification, as an rCUDA library, as other GPU virtualizations APIs, or as a standalone library, as will be recognized by those of skill in the art.

Figure 4:
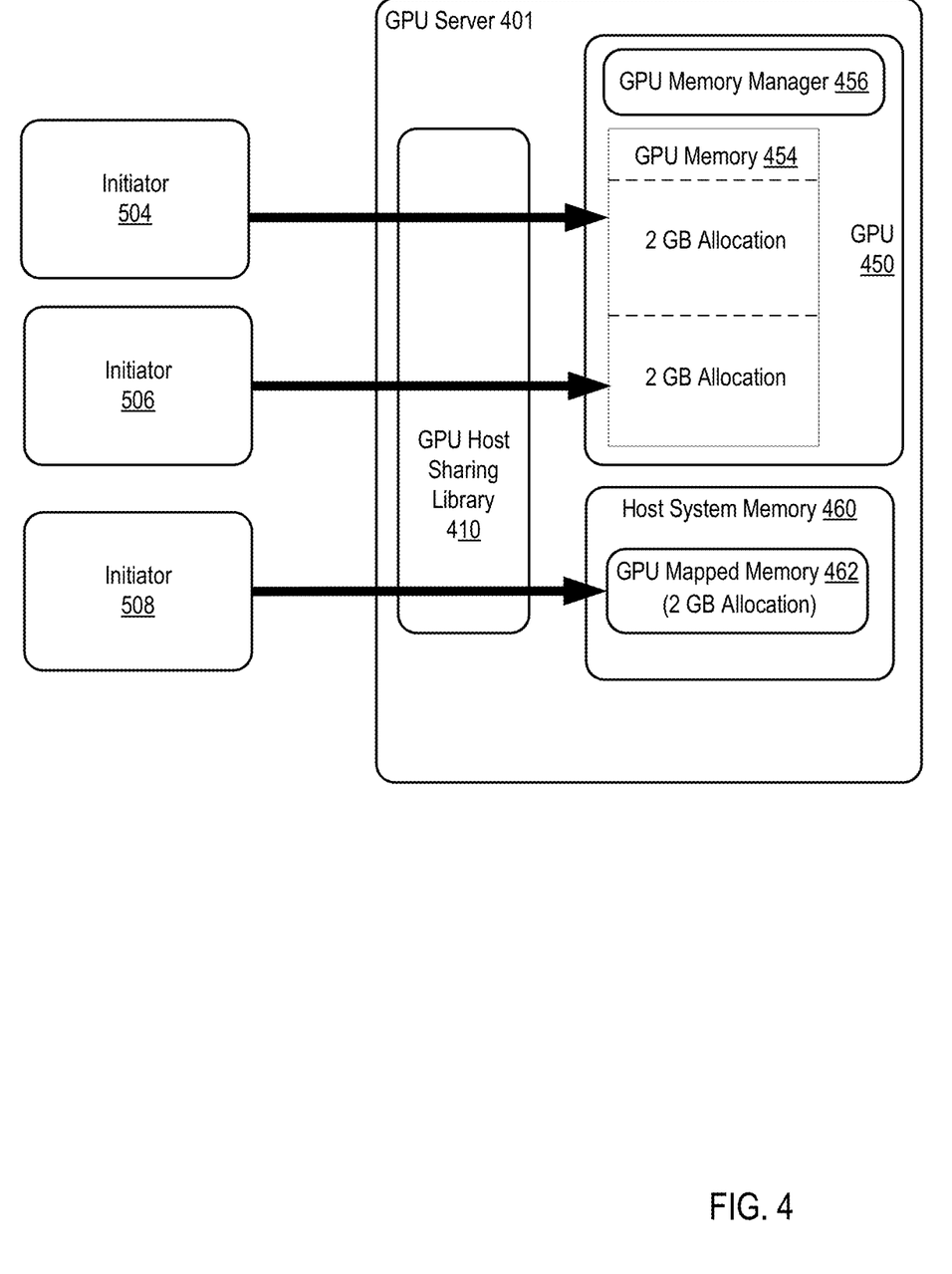
FIG. 4 is a block diagram illustrating exemplary memory management allocation for multiple initiators attached to a server configured for transparent memory management for over-subscribed accelerators according to embodiments of the present invention.

FIG. 4 is a block diagram illustrating exemplary memory management allocation for multiple initiators attached to a server configured for transparent memory management for over-subscribed accelerators according to embodiments of the present invention. In the example of FIG. 4, like numerals are used to represent like components as described with respect to FIG. 3. In the example of FIG. 4, GPU memory (454) includes 4 GB of memory, all of which has been allocated equally to two attached initiators (504, 506). That is, one initiator (504) is allocated a 2 GB portion of GPU memory (454) and accesses its allocated memory using direct memory addressing (DMA) via calls to the GPU host sharing library (410); another initiator (506) is allocated a 2 GB portion of GPU memory (454) and accesses its allocated memory using DMA via calls to the GPU host sharing library (410). The GPU memory manager (456) allocates GPU memory (454).

Continuing the example of FIG. 4, a new initiator (508) (which may be the initiator (470) in FIG. 3) attaches to the GPU server (401) and has a workload for processing by the GPU (450); however, there is no available GPU memory (454) to allocate to the new initiator (408). The GPU host sharing library (410), upon being unable to allocate memory from the GPU memory manager (456), requests a memory allocation of host system memory (460). GPU mapped memory (462) is allocated to the new initiator (508), which accesses the GPU mapped memory using DMA via calls to the GPU host sharing library (410). The GPU host sharing library (410) maps workload data and instructions to the GPU mapped memory (462) and communicates to GPU memory manager (456) of the mapping to system memory (460). Thus, the workloads of the prior attached initiators (504, 506) need not be interrupted to added new initiator (508). GPU memory manager (456) or other utilities in the GPU server (401) may continuously or periodically perform workload analytics and memory utilization analysis to adjust the memory allocation of GPU memory (454) to determine if memory has freed up or is being underutilized by the initiators (504, 506).

Figure 5:
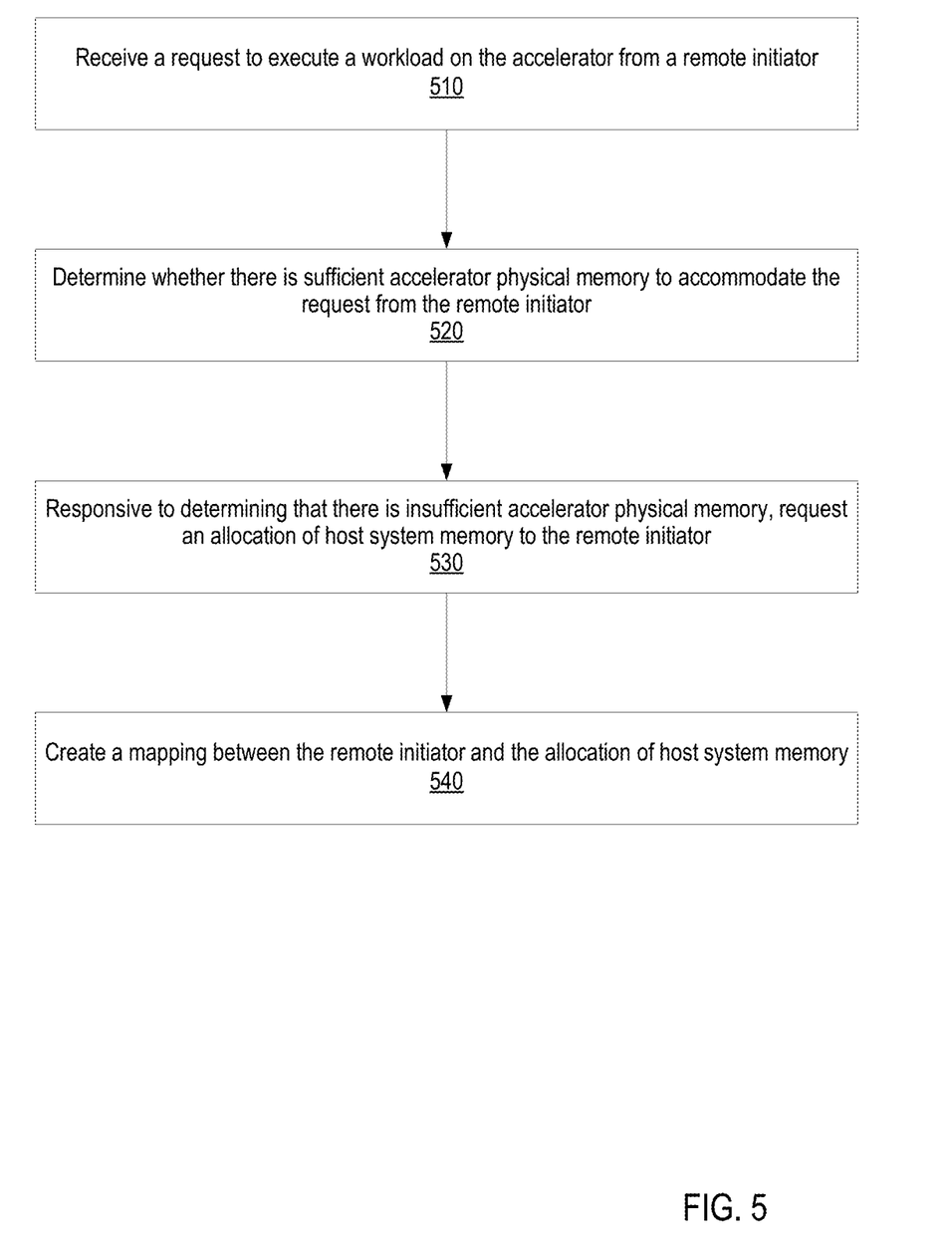
FIG. 5 is a flow diagram illustrating a method for transparent memory management for over-subscribed accelerators according to embodiments of the present invention.

For further explanation, FIG. 5 sets forth a flow chart illustrating an exemplary method for transparent memory management for over-subscribed accelerators according to embodiments of the present invention. The method of FIG. 5 may be implemented, for example, in the exemplary host GPU server (401) of FIG. 3. That is, in this example embodiment, the GPU server (401) hosts a shared accelerator comprising the GPU (450) that is shared by one or more initiators. However, embodiments in accordance with the present invention are not limited to GPU accelerators.

The method of FIG. 5 includes receiving (510), at a host system (401) comprising a shared accelerator (450), a request to execute a workload (434) on the accelerator (450) from a remote initiator (470). Receiving (510), at a host system (401) comprising a shared accelerator (450), a request to execute a workload (434) on the accelerator (450) from a remote initiator (470) may be carried out by the GPU host sharing library (410) receiving instructions and data through calls to its API from initiator GPU sharing library (430) of the remote initiator (470). The GPU host sharing library receives a workload request from the initiator (470). The workload request may include a request for the allocation of GPU processing resources (452), an allocation of GPU memory (454), and a request to instantiate a context (414) for GPU virtualization for the initiator (470).

The method of FIG. 5 also includes determining (520) that there is insufficient physical memory (454) of the accelerator (450) to accommodate the request from the remote initiator (470). Determining (520) that there is insufficient physical memory (454) of the accelerator (450) to accommodate the request from the remote initiator (470) may be carried out by the GPU host sharing library (410) requesting an allocation of GPU memory (454) from the GPU memory manager (456), and receiving an indication from the GPU memory manager (456) that there is not enough free physical GPU memory (454) to accommodate the request for allocation of GPU memory (454).

The method of FIG. 5 also includes, responsive to determining that there is insufficient physical memory (454) of the accelerator (450), requesting (530) an allocation of host system memory (462) to the remote initiator (470). Requesting (530) an allocation of host system memory (462) to the remote initiator (470) may be carried out by the GPU host sharing library requesting that the OS (154) allocate a portion of host system memory (460) for use by the remote initiator (470). The OS (154) may fulfill the request by providing the GPU host sharing library (410) with a block (462), or range of addresses, of host system memory (460) that has been allocated to the GPU sharing library (410) for use by the remote initiator (470).

The method of FIG. 5 also includes creating (540) a mapping between the remote initiator (470) and the allocation (462) of host system memory (460). Creating (540) a mapping between the remote initiator (470) and the allocation (462) of host system memory (460) may be carried out by the GPU host sharing library (410) directing instructions and data received from the remote initiator (470) through calls to the API of the GPU host sharing library (410) from the initiator GPU sharing library (430) to the allocation (462) of host system memory (460). Creating (460) a mapping between the remote initiator (470) and the allocation (462) of host system memory (460) may also be carried out by the GPU host sharing library (410) providing the remote initiator (470) with information to establish DMA access to the allocation (462) of host system memory (460).

Figure 6:
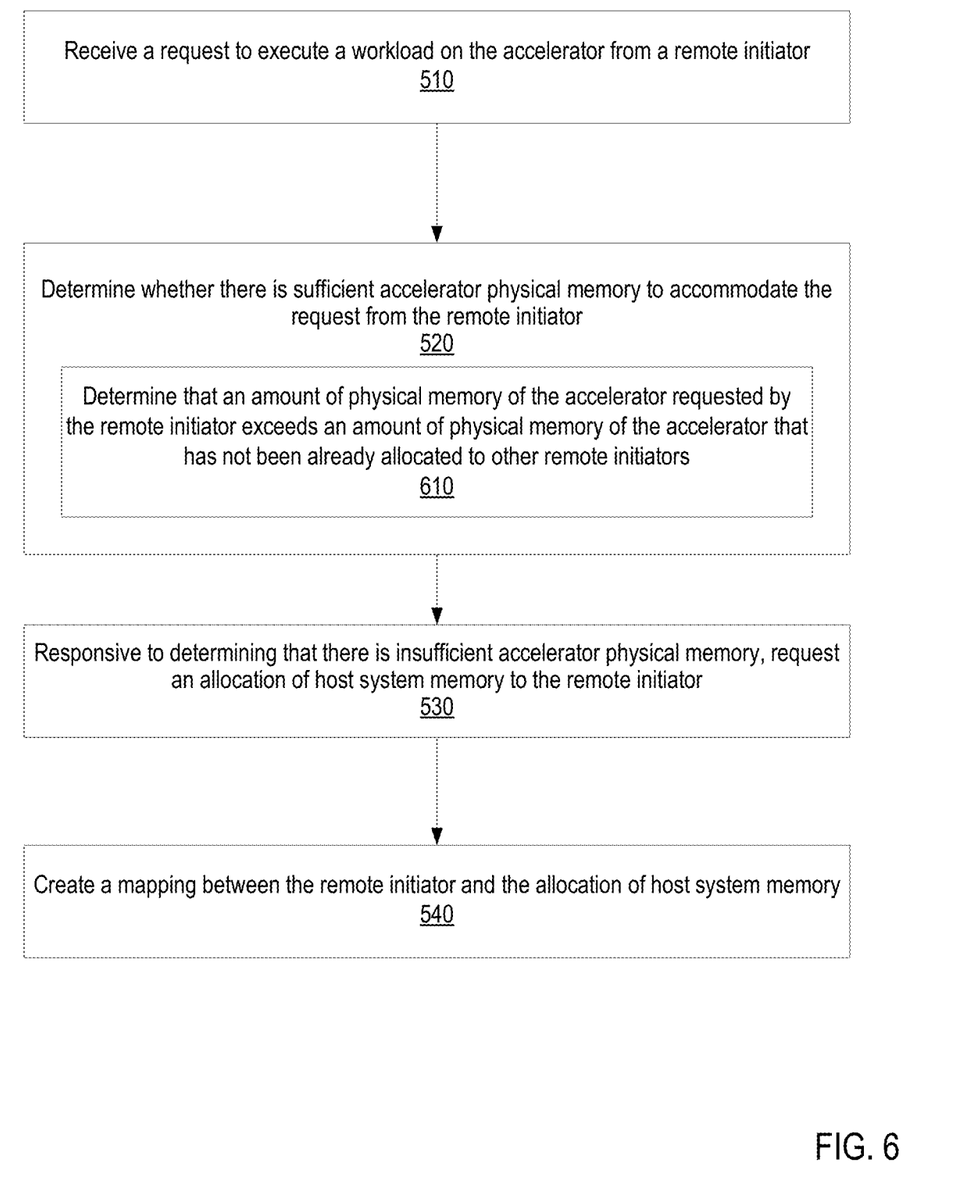
FIG. 6 is a flow diagram illustrating a method for transparent memory management for over-subscribed accelerators according to embodiments of the present invention.

For further explanation, FIG. 6 sets forth a flow chart illustrating an exemplary method for transparent memory management for over-subscribed accelerators according to embodiments of the present invention. FIG. 6 is similar to FIG. 5 in that it includes receiving (510), at a host system (401) comprising a shared accelerator (450), a request to execute a workload (434) on the accelerator (450) from a remote initiator (470), determining (520) that there is insufficient physical memory (454) of the accelerator (450) to accommodate the request from the remote initiator (470)), responsive to determining that there is insufficient physical memory (454) of the accelerator (450), requesting (530) an allocation of host system memory (462) to the remote initiator (470), and creating (540) a mapping between the remote initiator (470) and the allocation (462) of host system memory (460).

The method of FIG. 6 differs from the method of FIG. 5, however, in that determining (520) that there is insufficient physical memory (454) of the accelerator (450) to accommodate the request from the remote initiator (470) includes determining (610) that an amount of physical memory of the accelerator requested by the remote initiator exceeds an available amount of physical memory of the accelerator that has not been already allocated to one or more attached remote initiators. In the example system 400 of FIG. 4, two initiators (504, 506) have been allocated all of the GPU memory (454), such that any new request to the memory manager (456) for memory an allocation of GPU memory (454) cannot be fulfilled. In other examples, GPU memory (454) may include unallocated or free memory (for example, 1 GB of GPU memory), but the amount of free memory may be insufficient to fulfill the requirements (for example, 2 GB of GPU memory) of the new initiator.

Figure 7:
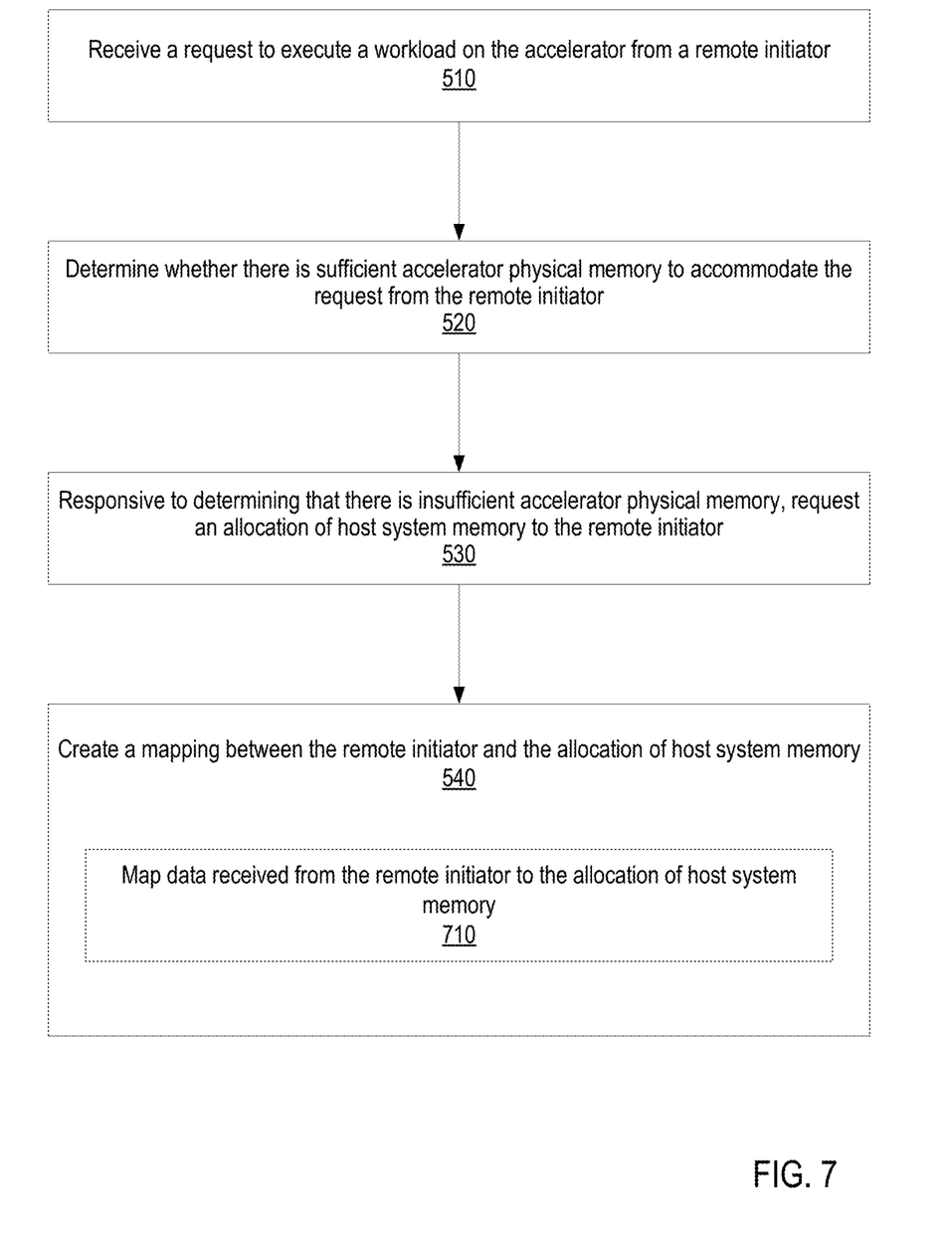
FIG. 7 is a flow diagram illustrating a method for transparent memory management for over-subscribed accelerators according to embodiments of the present invention.

For further explanation, FIG. 7 sets forth a flow chart illustrating an exemplary method for transparent memory management for over-subscribed accelerators according to embodiments of the present invention. FIG. 7 is similar to FIG. 5 in that it includes receiving (510), at a host system (401) comprising a shared accelerator (450), a request to execute a workload (434) on the accelerator (450) from a remote initiator (470), determining (520) that there is insufficient physical memory (454) of the accelerator (450) to accommodate the request from the remote initiator (470)), responsive to determining that there is insufficient physical memory (454) of the accelerator (450), requesting (530) an allocation of host system memory (462) to the remote initiator (470), and creating (540) a mapping between the remote initiator (470) and the allocation (462) of host system memory (460).

The method of FIG. 7 differs from the method of FIG. 5, however, in that creating (540) a mapping between the remote initiator (470) and the allocation (462) of host system memory (460) includes mapping (710), by a shared accelerator library, data received from the remote initiator (470) to the allocation of host memory. Mapping (710), by the shared accelerator library, data received from the remote initiator (470) to the allocation of host memory may be carried out by the GPU host sharing library (410) operating the GPU mapped memory (462) as a buffer for the workload (434) of the remote initiator (470). Instructions and data for the workload (434) are stored in the GPU mapped memory (462), and the GPU host sharing library (410) informs the GPU memory manager (456) of the mapping. The workload stored in the GPU mapped memory (462) may then be processed by the GPU (450) as if the workload was stored in the GPU memory (454) with coordinated swapping of elements into and out of the GPU memory (450) by the GPU memory manager (456).

Figure 8:
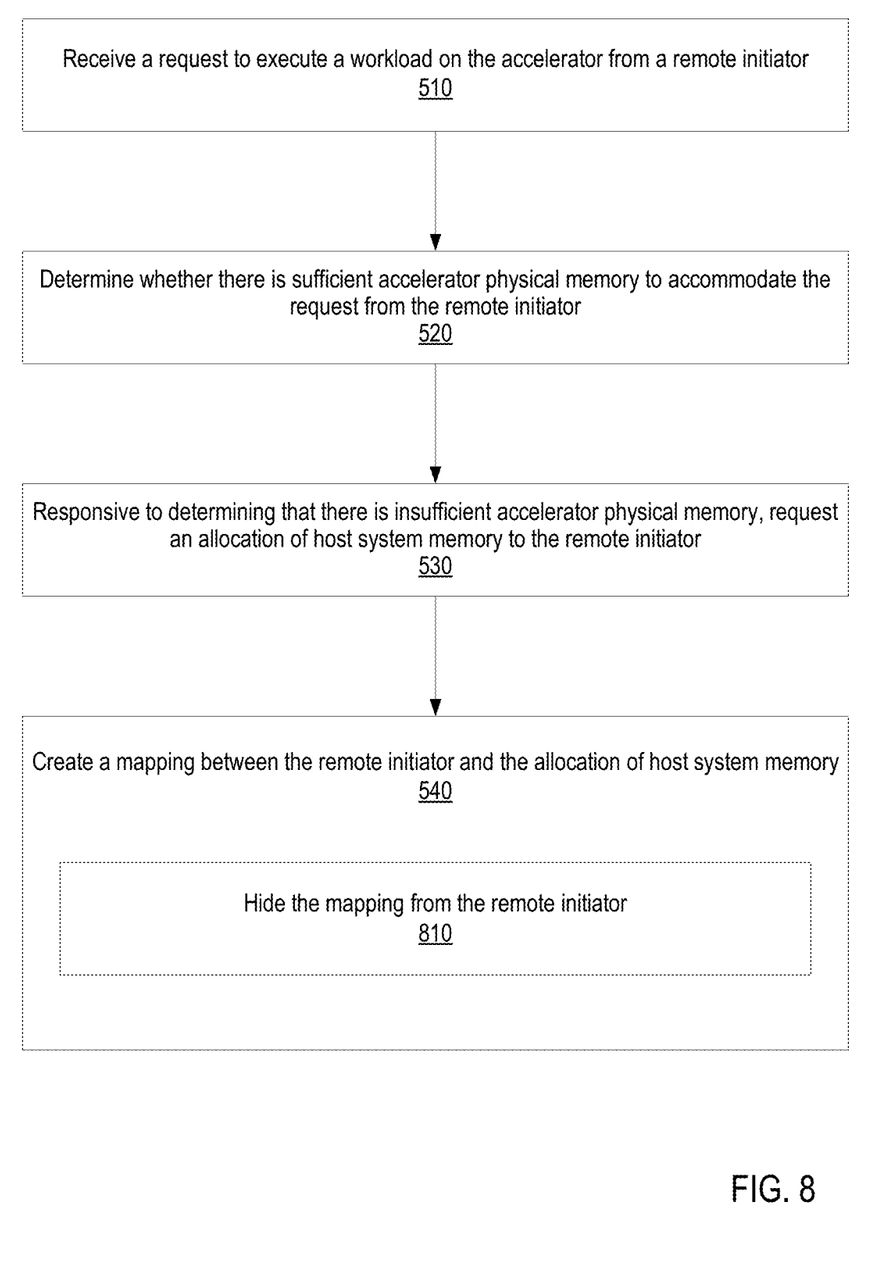
FIG. 8 is a flow diagram illustrating a method for transparent memory management for over-subscribed accelerators according to embodiments of the present invention.

For further explanation, FIG. 8 sets forth a flow chart illustrating an exemplary method for transparent memory management for over-subscribed accelerators according to embodiments of the present invention. FIG. 8 is similar to FIG. 5 in that it includes receiving (510), at a host system (401) comprising a shared accelerator (450), a request to execute a workload (434) on the accelerator (450) from a remote initiator (470), determining (520) that there is insufficient physical memory (454) of the accelerator (450) to accommodate the request from the remote initiator (470)), responsive to determining that there is insufficient physical memory (454) of the accelerator (450), requesting (530) an allocation of host system memory (462) to the remote initiator (470), and creating (540) a mapping between the remote initiator (470) and the allocation (462) of host system memory (460).

The method of FIG. 8 differs from the method of FIG. 5, however, in that creating (540) a mapping between the remote initiator (470) and the allocation (462) of host system memory (460) includes hiding (810), by a shared accelerator library, the mapping from the remote initiator (470). Hiding (810), by a shared accelerator library, the mapping from the remote initiator (470) may be carried out by the GPU host sharing library (410) not informing the remote initiator (470) the allocated GPU mapped memory (462) is host system memory (460) instead of the requested GPU memory (454). By making the mapping transparent to the remote initiator (470), that is, invisible to the remote initiator (470), over-subscription of the GPU (450) is facilitated without any knowledge or participation by the remote initiator (470). Accordingly, no modification of the initiator GPU sharing library (430) is needed.

Figure 9:
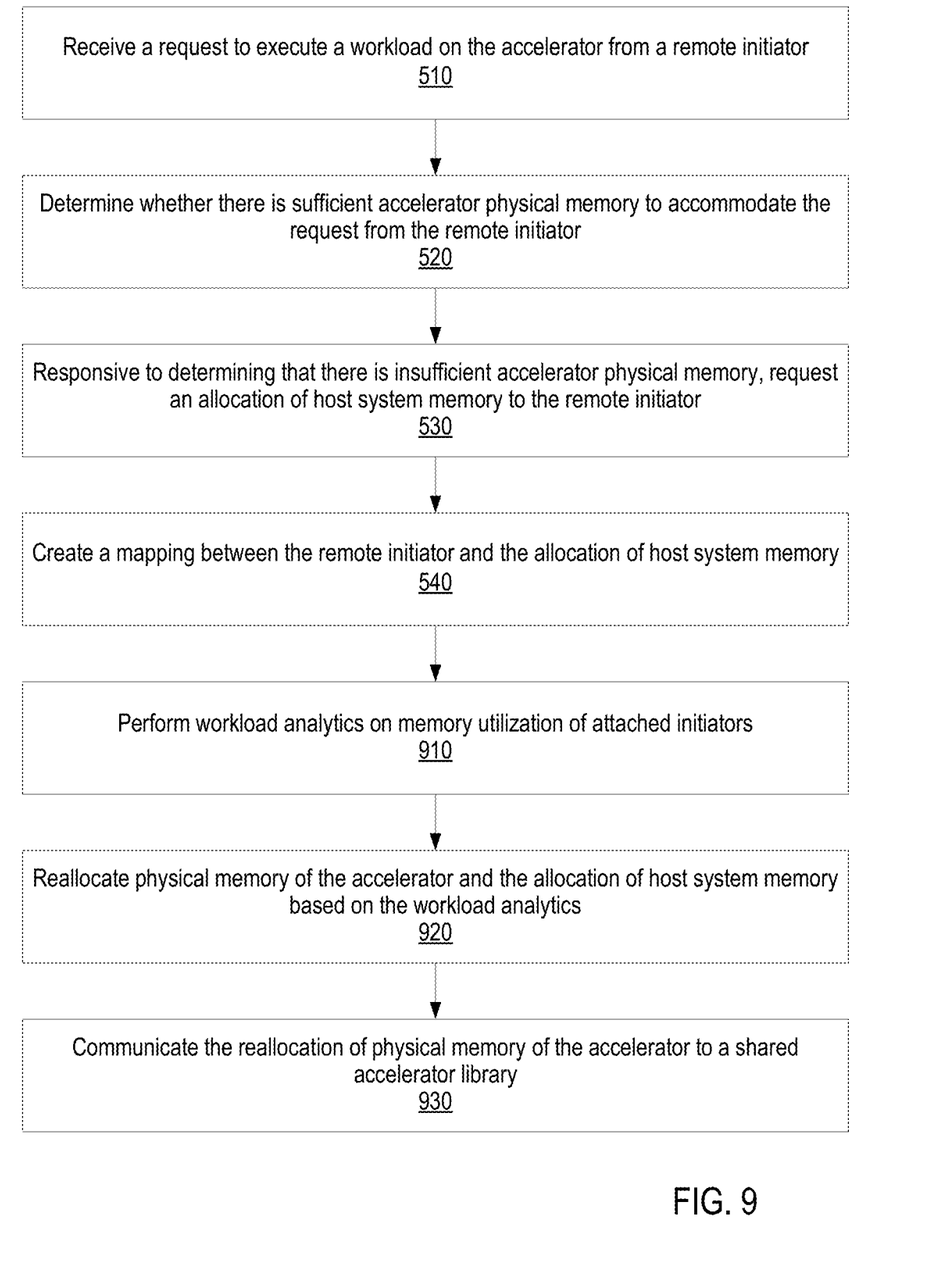
FIG. 9 is a flow diagram illustrating a method for transparent memory management for over-subscribed accelerators according to embodiments of the present invention.

For further explanation, FIG. 9 sets forth a flow chart illustrating an exemplary method for transparent memory management for over-subscribed accelerators according to embodiments of the present invention. FIG. 9 is similar to FIG. 5 in that it includes receiving (510), at a host system (401) comprising a shared accelerator (450), a request to execute a workload (434) on the accelerator (450) from a remote initiator (470), determining (520) that there is insufficient physical memory (454) of the accelerator (450) to accommodate the request from the remote initiator (470)), responsive to determining that there is insufficient physical memory (454) of the accelerator (450), requesting (530) an allocation of host system memory (462) to the remote initiator (470), and creating (540) a mapping between the remote initiator (470) and the allocation (462) of host system memory (460).

The method of FIG. 9 differs from the method of FIG. 5, however, in that it further includes performing (910) workload analytics on memory utilization by attached initiators (504, 506, 508). Performing (910) workload analytics on memory utilization by attached initiators (504, 506, 508) may be carried out by the GPU memory manager (456) analyzing how much memory an initiator (504, 506, 508) is using on average, how frequently certain areas of memory are accessed by each initiator (504, 506, 508), how frequently certain instructions are executed in the workload of each initiator (504, 506, 508), and other forms of memory analytics as will be recognized by those of skill in the art.

The method of FIG. 9 also differs from the method of FIG. 5 in that it further includes reallocating (920) physical memory of the accelerator and the allocation of host system memory based on the workload analytics. Reallocating (920) physical memory of the accelerator and the allocation of host system memory based on the workload analytics may be carried out by the GPU memory manager (456) storing more data from the GPU mapped memory (462) in a local cache (not shown) to mitigate performance degradation. Reallocating (920) physical memory of the accelerator and the allocation of host system memory based on the workload analytics may also be carried out by the GPU host sharing library (410) remapping a prior attached remote initiator (504, 506) to GPU mapped memory (462) because the prior attached remote initiator (504, 506) is underutilizing its allocation of GPU memory (454), and remapping the new remote initiator (508) from the GPU mapped memory (462) to the GPU memory (454) based on the workload analytics of the remote initiator (508).

The method of FIG. 9 also differs from the method of FIG. 5 in that it further includes communicating (930) the reallocation of physical memory of the accelerator to a shared accelerator library. Communicating (930) the reallocation of physical memory of the accelerator to a shared accelerator library may be carried out by the GPU memory manager (456) informing the GPU host sharing library (410) that the GPU memory (454) has been reallocated, thereby allowing the GPU host sharing library (410) to update mappings accordingly.

In view of the explanations set forth above, readers will recognize that the benefits of transparent memory management for over-subscribed accelerators according to embodiments of the present invention include:

the running accelerator workload of the initiators which have been assigned the remote accelerator memory will not be interrupted to reassign the accelerator resource when a new initiator is added;

the accelerator sharing library may perform workload analytics on memory access amongst the initiators, allowing for performance optimization on placement of initiator data into accelerator memory directly or the buffer on the target host memory;

memory management is embedded in the accelerator sharing library, thus eliminating the need for the initiator to know that the accelerator is shared in any way, or that the initiator is using host system memory instead of accelerator memory.

Exemplary embodiments of the present invention are described largely in the context of a fully functional computer system for transparent memory management for over-subscribed accelerators. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of transparent memory management for over-subscribed accelerators, the method comprising:
   receiving, at a host system comprising a shared accelerator, a request to execute a workload on the accelerator from a remote initiator;
   determining that there is insufficient physical memory of the accelerator to accommodate the request from the remote initiator;
   responsive to determining that there is insufficient physical memory of the accelerator, requesting an allocation of accelerator mapped memory from host system memory to the remote initiator; and
   creating a mapping between the remote initiator and the allocation of host system memory.

2. The method of claim 1, wherein determining that there is insufficient physical memory of the accelerator to accommodate the request from the new initiator includes determining that an amount of physical memory of the accelerator that has not been already allocated to one or more attached remote initiators exceeds an amount of physical memory of the accelerator requested by the remote initiator.

3. The method of claim 1, wherein creating a mapping between the remote initiator and the allocation of host system memory includes mapping, by a shared accelerator library, data received from the remote initiator to the allocation of host system memory.

4. The method of claim 1, wherein creating a mapping between the remote initiator and the allocation of host system memory includes communicating, by a sharing library on the host system to a memory manager of the accelerator, information about the mapping between the remote initiator and the allocation of host system memory.

5. The method of claim 1, wherein creating a mapping between the remote initiator and the allocation of host system memory includes hiding, by a shared accelerator library, the mapping from the remote initiator, wherein the allocation of host system memory is used for processing the workload in the request by the remote initiator.

6. The method of claim 1, further comprising:
   performing workload analytics on memory utilization by attached initiators;
   reallocating physical memory of the accelerator and the allocation of host system memory based on the workload analytics; and
   communicating the reallocation of physical memory of the accelerator to a shared accelerator library.

7. The method of claim 1, wherein the accelerator is a graphics processing unit (GPU) and/or a field programmable gate array (FPGA).

8. An apparatus for transparent memory management for over-subscribed accelerators, the apparatus comprising a computer processor, a non-volatile computer memory operatively coupled to the computer processor, the computer memory having disposed within it computer program instructions that are configured to, when executed by the computer processor, cause the apparatus to perform operations comprising:
   receiving, at a host system comprising a shared accelerator, a request to execute a workload on the accelerator from a remote initiator;
   determining that there is insufficient physical memory of the accelerator to accommodate the request from the remote initiator;
   responsive to determining that there is insufficient physical memory of the accelerator, requesting an allocation of accelerator mapped memory from host system memory to the remote initiator; and
   creating a mapping between the remote initiator and the allocation of host system memory.

9. The apparatus of claim 8, wherein determining that there is insufficient physical memory of the accelerator to accommodate the request from the new initiator includes determining that an amount of physical memory of the accelerator that has not been already allocated to one or more attached remote initiators exceeds an amount of physical memory of the accelerator requested by the remote initiator.

10. The apparatus of claim 8, wherein creating a mapping between the remote initiator and the allocation of host system memory includes mapping, by a shared accelerator library, data received from the remote initiator to the allocation of host system memory.

11. The apparatus of claim 8, wherein creating a mapping between the remote initiator and the allocation of host system memory includes communicating, by a sharing library on the host system to a memory manager of the accelerator, information about the mapping between the remote initiator and the allocation of host system memory.

12. The apparatus of claim 8, wherein creating a mapping between the remote initiator and the allocation of host system memory includes hiding, by a shared accelerator library, the mapping from the remote initiator.

13. The apparatus of claim 8, the operations further comprising:
   performing workload analytics on memory utilization by attached initiators;
   reallocating physical memory of the accelerator and the allocation of host system memory based on the workload analytics; and
   communicating the reallocation of physical memory of the accelerator to a shared accelerator library.

14. The apparatus of claim 8, wherein the accelerator is a graphics processing unit (GPU) and/or a field programmable gate array (FPGA).

15. A computer program product for transparent memory management for over-subscribed accelerators, the computer program product comprising a non-volatile computer readable medium and computer program instructions stored on the non-volatile computer readable medium, the computer program instructions configured to, when executed by a computer, cause the computer to perform operations comprising:

receiving, at a host system comprising a shared accelerator, a request to execute a workload on the accelerator from a remote initiator;

determining that there is insufficient physical memory of the accelerator to accommodate the request from the remote initiator;

responsive to determining that there is insufficient physical memory of the accelerator, requesting an allocation of accelerator mapped memory from host system memory to the remote initiator; and creating a mapping between the remote initiator and the allocation of host system memory.

16. The computer program product of claim 15, wherein determining that there is insufficient physical memory of the accelerator to accommodate the request from the new initiator includes determining that an amount of physical memory of the accelerator that has not been already allocated to one or more attached remote initiators exceeds an amount of physical memory of the accelerator requested by the remote initiator.

17. The computer program product of claim 15, wherein creating a mapping between the remote initiator and the allocation of host system memory includes mapping, by a shared accelerator library, data received from the remote initiator to the allocation of host system memory.

18. The computer program product of claim 15, wherein creating a mapping between the remote initiator and the allocation of host system memory includes communicating, by a sharing library on the host system to a memory manager of the accelerator, information about the mapping between the remote initiator and the allocation of host system memory.

19. The computer program product of claim 15, wherein creating a mapping between the remote initiator and the allocation of host system memory includes hiding, by a shared accelerator library, the mapping from the remote initiator.

20. The computer program product of claim 15, the operations further comprising:

performing workload analytics on memory utilization by attached initiators;

reallocating physical memory of the accelerator and the allocation of host system memory based on the workload analytics; and communicating the reallocation of physical memory of the accelerator to a shared accelerator library.

* * * * *